Sept. 2, 1969  C. FROGER  3,464,269
HOT-WIRE ANEMOMETERS
Filed March 16, 1966  6 Sheets-Sheet 1
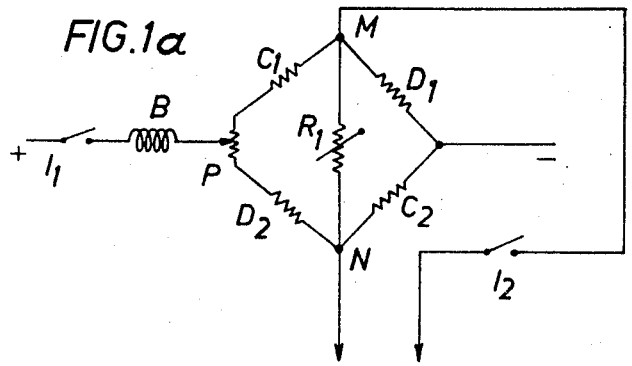
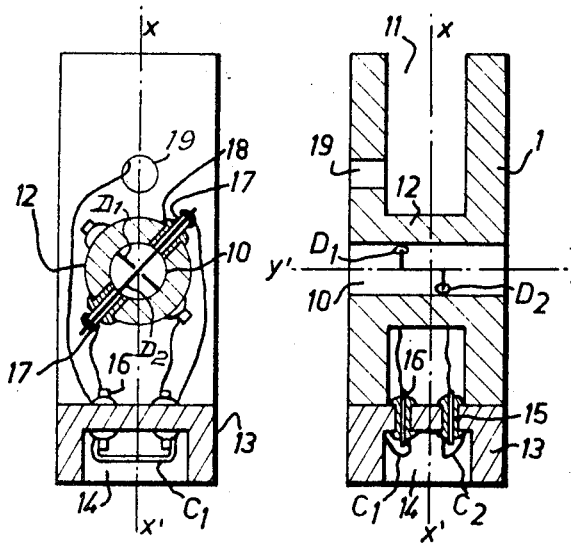
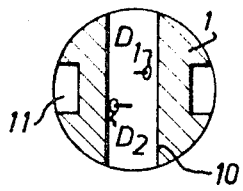
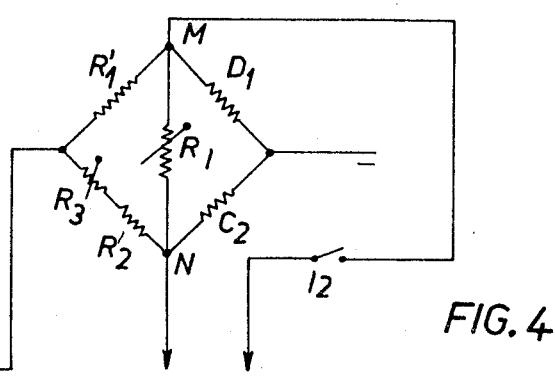
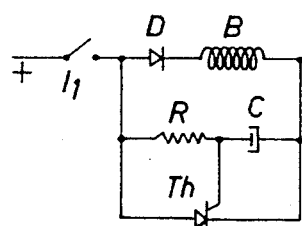
INVENTOR
CLAUDE FROGER
BY KARL W. FLOCKS
ATTORNEY Sept. 2, 1969   C. FROGER   3,464,269
HOT-WIRE ANEMOMETERS Filed March 16, 1966   6 Sheets-Sheet 2

INVENTOR
CLAUDE FROGER
BY Karl W. Flocks
ATTORNEY

Sept. 2, 1969  C. FROGER  3,464,269
HOT-WIRE ANEMOMETERS
Filed March 16, 1966  6 Sheets-Sheet 3
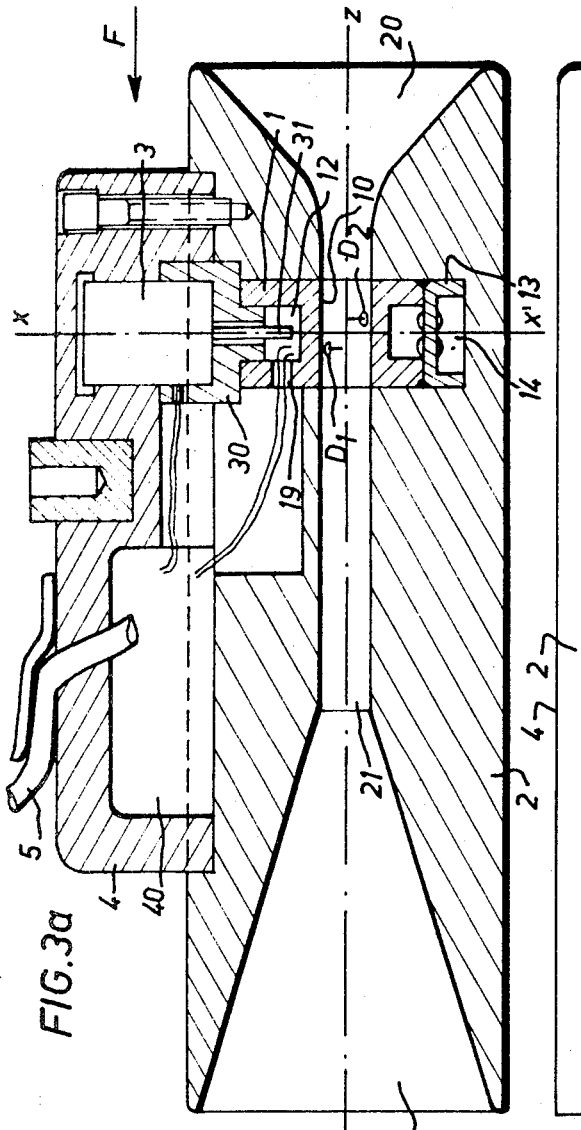
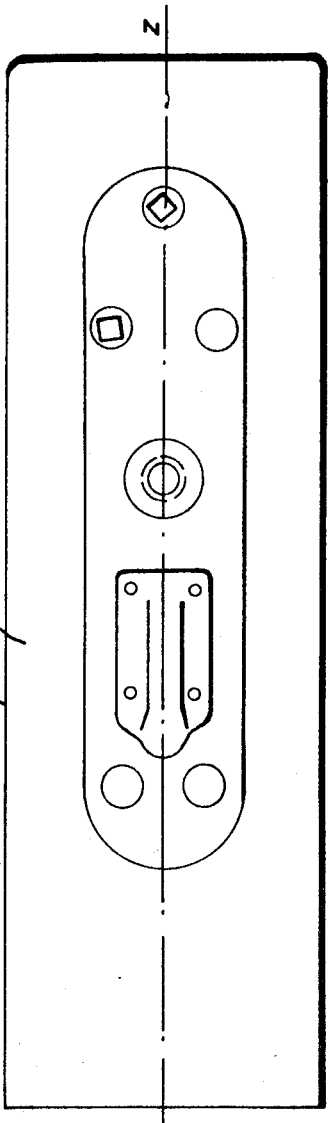
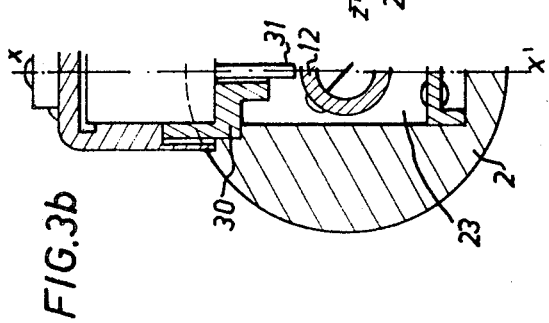
INVENTOR
CLAUDE FROGER Sept. 2, 1969  C. FROGER  3,464,269
HOT-WIRE ANEMOMETERS
Filed March 16, 1966  6 Sheets-Sheet 4

INVENTOR
CLAUDE FROGER
BY Karlw Flocks
ATTORNEY

Sept. 2, 1969 C. FROGER 3,464,269
HOT-WIRE ANEMOMETERS
Filed March 16, 1966 6 Sheets-Sheet 6

INVENTOR
CLAUDE FROGER
BY Karl W. Flocks
ATTORNEY

United States Patent Office 3,464,269
Patented Sept. 2, 1969

3,464,269
HOT-WIRE ANEMOMETERS
Claude Froger, Verneuil-en-Halatte, France, assignor to Charbonnages de France, Paris, France, a public institution of France
Filed Mar. 16, 1966, Ser. No. 534,897
Claims priority, application France, Mar. 19, 1965, 10,036, Patent 1,436,831
Int. Cl. G01f 1/00
U.S. Cl. 73—204    12 Claims

ABSTRACT OF THE DISCLOSURE

A hot-wire anemometer for measuring the speed of gaseous fluids utilizing a Wheatstone bridge with a detector filament as one arm of the bridge and said filament placed in a carrier block, with an electromagnet having a blade to strike a portion of the carrier block at intervals other than the testing time to remove dust and particles accumulating on the detector filament.

---

A present invention relates generally to a hot-wire device or anemometer for measuring the speed of gaseous fluids in circulation, which fluids may in particular convey certain dust or particles which are capable of interfering with the measurement.

Hot-wire anemometers are well-known instruments and have a large number of uses, amongst which is the formation of ventilation indicating apparatus.

Generally speaking, they comprise at least one filament of conductive metal, known as a detector filament, the said detector filament being inserted in one of the arms of a Wheatstone bridge supplied from a source of electrical energy. The detector filament, heated by the passage of the electric current, is immersed in the flow of the fluid the speed of which is to be measured. The passage of the fluid over the hot filament cools it down and in consequence varies its electrical resistance. A difference of potential appears on the measuring diagonal of the Wheatstone bridge, and its value is taken as the value representing the speed of the flow of gas.

The utilization of this type of instrument in dusty atmospheres creates however certain problems. In fact, the inevitable deposit of dust on the detector filament disturbs the thermal exchanges between the latter and the gaseous fluid, and this results, for the same speed of the fluid, in variations of the signal representing the value of the speed of the gaseous flow.

The device according to the invention comprises, in known manner, a Wheatstone bridge of which at least one of the arms is formed by a hot detector filament immersed in a flow of gas even loaded with dust, the speed of which is to be measured, and is essentially characterized by the fact that it comprises means for impressing a slight mechanical vibration on the detector filament, by means of shocks at pre-determined instants, so that when the anemometer is utilized in a flow of gas which conveys dust or particles, the effect of these latter on the measurement is eliminated.

In accordance with other characteristic features:

The means for impressing a slight vibration on the detector filament are constituted by an electro-magnet, the blade of which strikes the filament-carrier block through the intermediary of a rod to which it is fixed.

The coil of the electro-magnet is connected in series with the supply to the Wheatstone bridge.

The coil of the electro-magnet is shunted by the anode-cathode junction of a S.C.R. which is normally in the blocked condition, and the control electrode of which is controlled by a time-constant combination, so as to short-circuit the above-mentioned coil at an instant located between the instant of application of voltage to the bridge and the instant of interrogation proper.

Two opposite arms of the Wheatstone bridge are each constituted by a detector filament, the said filaments being arranged along two diameters at right angles of a conduit of small diameter pierced in a support in which the filament carrier is housed, the two other arms being each formed by a compensating filament, of the same nature as the detector filaments, placed in a chamber in communication with the ambient gaseous fluid, and in which the fluid is substantially stationary.

In accordance with various alternative forms of embodiments:

The detector and compensating filaments are identically constituted by a straight wire of electrically-conducting metal.

The support in which the filament-carrier block is mounted comprises a convergent portion in the direction of flow of the gaseous fluid, a conduit of constant diameter inside which the detector filaments are mounted, and a divergent portion.

The support comprises, in the direction of flow of the gaseous fluid, a hemispherical extremity provided with a calibrated orifice, a cylindrical conduit of constant diameter greater than that of the calibrated orifice, and in which are mounted the detector filaments, and a hemispherical extremity.

The support is composed of a cylindrical conduit of constant diameter, in which are placed the detector filaments, and the extremities of which permit the coupling to flexible pipes.

Other characteristic features and advantages of the present invention will be brought out in the description which follows below, reference being made to the accompanying drawings, in which:

FIG. 1a is the electrical diagram of a device according to the invention, in which the supply coil of the electro-magnet is connected in series with the supply to the bridge;

FIGS. 2a, 2b and 2c are three views in cross section of a filament-carrier block;

FIGS. 3a, 3b and 3c are three views of a form of embodiment of the invention;

FIG. 4 is the electrical diagram of a first possible form of construction of the device according to the invention;

Figure 1B:
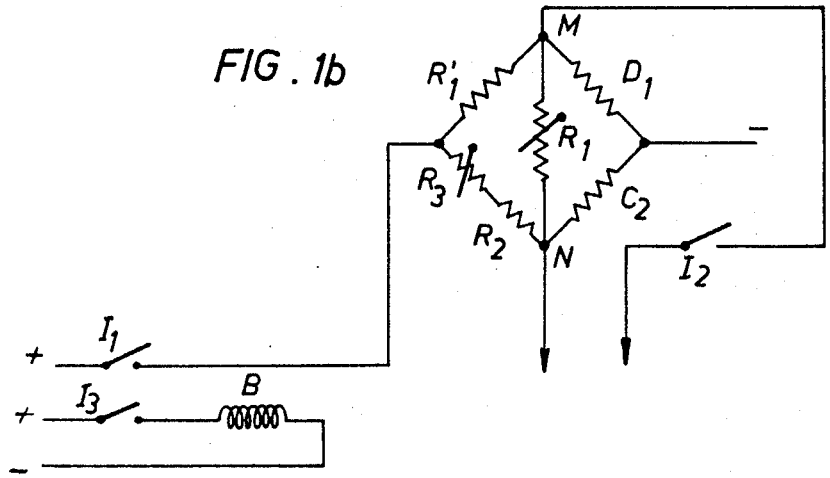
FIG. 1b is the electrical diagram of a device according to the invention, in which the coil of the electro-magnet is supplied from a source separate from that which supplies the bridge.

The sensitive element of the device according to the invention is a Wheatstone bridge, of which one form of construction is shown in FIG. 1a. The four arms of this bridge are identically constituted by straight filaments $D_1$, $D_2$, $C_1$, $C_2$, of a material of good electrical conductivity, for example pure platinum.

The Wheatstone bridge is supplied with electrical energy from a constant direct-current source (not shown) and by means of a switch $I_1$ in series with the coil B of an electromagnet, the function of which will be explained later.

The bridge further comprises, in a manner known per se, a balancing potentiometer P and a variable resistance $R_1$ mounted in measuring diagonal.

The above-mentioned filaments are mechanically supported by a filament-carrier block 1, of which one form of construction is shown in FIGS. 2a, 2b and 2c which are three diagrammatic cross-sections.

In more detail, the block 1 of elongated cylindrical form with a longitudinal axis $x'-x$ is pierced with a cylindrical channel 10 having an axis $y'-y$ at right angles to the axis $x'-x$. A circular groove 11 having its axis at $y'-y$ formed in the body of the block 1, defines a cylindrical ring 12. A cylindrical cup 13 of the same diameter and the same axis as the block 1 is fixed rigidly on one of the extremities of the said block. The bottom of the cylindrical chamber 14 of the said cup is provided with four insulating bushings 15 opening into the groove 11, and in each of which is inserted a metal sleeve 16.

The detector filaments $D_1$ and $D_2$ are arranged along two adjacent diameters at right angles of the channel 10, and are fixed on the block 1 by welding on the metal sleeves 17 respectively inserted in the insulating bushings 18 fixed on the ring 12.

The compensating filaments $C_1$ and $C_2$ are fixed by welding on the above-mentioned metal sleeves 16 and are arranged in the chamber 14 of the cup 13, the various connections between the detector and compensating filaments being effected by means of flexible wires soldered in a suitable manner on the various metal sleeves, and shown diagrammatically in full lines on FIGS. 2a, 2b and 2c.

An orifice 19 pierced in the block 1 permits the connection of the filament bridge to the remainder of the electrical apparatus (potentiometer P, coil D, source, measuring instrument) by means of flexible wires.

The filament-carrier block 1 is mounted in a support immersed in the flow of gas, the speed of which is to be measured. FIGS. 3a, 3b, 3c, represent three views of a form of construction of the device according to the invention, completely assembled, the arrow F representing the direction of flow of the gas.

The anemometer according to the invention, when employed in a dust-laden flow of gas, comprises essentially:

(1) A support, the body 2 of which is pierced longitudinally with a conduit consisting, from upstream to downstream sides, of a convergent section 20, a cylindrical channel 21 of constant diameter equal to that of the channel 10, and a divergent section 22; the general shape of the body 2 of the support, the opening angles of the convergent-divergent portions, are chosen in such manner as to obtain a stable flow of the fluid in the interior of the channel 21, without detachment of the fluid streams at the outer surface of the support and at the outlet of the divergent portion.

A cylindrical shape and opening angles of 90° for the convergent portion and 20° for the divergent portion represent acceptable values.

(2) A cylindrical transverse well 23, cut in the body 2, in which the block 1 is fitted with light friction; this well opens into the cylindrical channel 21 and its depth is such that when the cup 13 is resting on its bottom, the axis of the channel 10 is coincident with the axis of the channel 21.

(3) A miniature electro-magnet shown diagrammatically at 3 and housed in a cradle 30 placed on the free extremity of the block 1; the blade of the electro-magnet is rigidly fixed to a rod 31, the extremity of which, in the state of rest, is located close to the outer surface of the ring 12.

(4) A cover 4 provided with a chamber 40, in which the remainder of the electrical apparatus is housed, the connections with the direct-current source on the one hand and with the measuring instrument on the other being effected by means of the cable 5.

When the apparatus is immersed in the flow of gas, the channel 21 is traversed by a fraction of the gaseous flow in which the support is immersed, the speed of this fraction being a function of the speed of the main flow of gas. The chamber 14 is then filled with a non-turbulent atmosphere formed by a further fraction of the flow of gas.

The operation of the device is then as follows: at every application of voltage to the Wheatstone bridge by means of the switch $I_1$, the rod 31 strikes the ring 12 which supports the filaments. The shock is sufficient to cause the filaments to vibrate slightly, which results in the fall of the dust which has been deposited on the detector filaments $D_1$ and $D_2$ since the previous interrogation.

In accordance with the alternative form shown in the electrical diagram of FIG. 1b, the supply source of the coil B is separate from that which supplies the measuring bridge, so that this latter can be continually under tension through the intermediary (or medium) of switch I, and at least one shock can be produced before each interrogation by $I_2$ through the intermediary of the switch $I_3$.

An electric current of constant value passes through the bridge and brings the four filaments of a certain temperature. In the absence of a flow of gas, the potentiometer P enables the points M and N to be initially regulated to the same potential, thus determining the origin of the readings on the measuring instrument connected between these two points (setting of the zero).

The passage of a flow of gas over the detector filaments cools them, which has the effect of reducing their electrical resistance.

As the temperature of the compensating filaments remains constant, a potential difference appears between the points M and N. It is this quantity, a function of the speed of the flow of gas, which is measured after the closure of the switch $I_2$ (interrogation properly so-called).

Some advantages of the proposed system can already be observed at this point:

The fact of using two detector filaments enables the out-of-balance voltage appearing between the points M and N to be doubled;

The fact of arranging the detector filaments along two diameters at right angles of the channel 21 enables the influence of the flow of gas on the sensitive element D1–D2 of the Wheatstone bridge to be more uniformly distributed;

The fact of placing the compensating filament in a chamber containing a fraction of the gaseous flow freed from movement or turbulence improves the compensation as a function of the variations of the composition of the gaseous flow, eliminates zero wander and reduces the variation in sensitivity due to catharometric effect appearing when the compensating filaments are placed in a fluid-tight chamber filled with a reference gas having a nature or composition different from those of the gaseous flow, of which it is desired to measure the speed.

Figure 5:
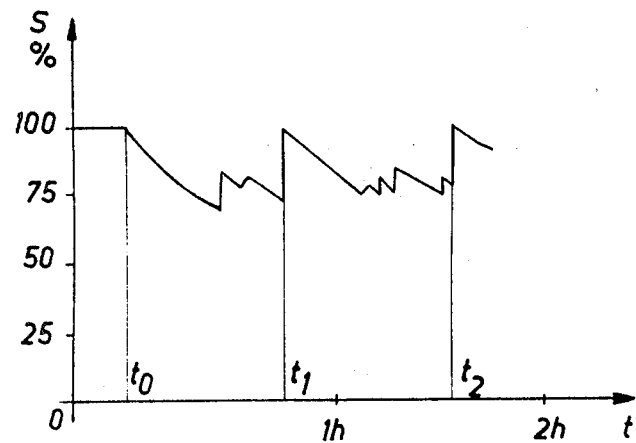
FIGS. 5 and 6 are two curves representing the operation of the device immersed in a dust-laden flow of gas of constant speed, and constituted on the one hand as regards FIG. 5, by the support of FIGS. 3a to 3c with the electrical connection of FIG. 1a, and on the other hand, with respect to FIG. 6, by the same support of FIGS. 3a to 3c with the electrical connections of FIG. 4.

In order to study the influence of dust on the behaviour of the apparatus according to the invention, this latter was placed in the axis of a laboratory tunnel of rectangular section through which was passed a flow of air, the speed of which was maintained constant at a value of 0.25 m./sec. The curve shown in FIG. 5 represents the variation of the signal supplied by the bridge plotted against its time of operation.

During the period $0-t_0$, the flow of air is pure, the electro-magnet is short-circuited. The signal supplied by the bridge constitutes the reference 100%.

The charging of the flow of air with dust begins at the time $t_0$. It is maintained constant during the remainder of the test at a content of 18,800 particles of coal per cu.cm., of which 91.4% are less than $5\mu$.

During the period $t_0-t_1$, the electro-magnet is kept short-circuited: a rapid reduction of the signal supplied by the bridge is observed, reaching 25% of the initial signal at the end of about 25 minutes. The agglomerate of dust which forms round the detector filaments increases in size: its fragility increases and the less adherent parts become detached, which has the effect of momentarily restoring a part of the sensitivity of the bridge.

A shock applied at the time $t_1$ by the electro-magnet on the ring enables the detector filaments to be almost completely freed of the deposited dust and brings the signal which it supplies to its initial value.

During the period $t_1-t_2$, the electro-magnet is again short-circuited and the same phenomenon can be observed as previously. A shock applied to the ring at the instant $t_2$ brings the signal back to its initial level.

In this test, the signal was recorded on an electronic potentiometer. It may be envisaged to carry out the measurement by any other means, for example by transforming the out-of-balance voltage of the bridge to a variable frequency, the variations in frequency supplied by the voltage-frequency coding device being a function of the variations of the said out-of-balance voltage.

It may then happen that the self-inductance of the coil B of the electro-magnet disturbs the operation of the measuring instrument or the coding device.

FIG. 4 shows the electrical diagram of a form of embodiment which reduces this risk.

The circuit comprised by the resistance R, the capacity C and the S.C.R. T$h$, connected to the terminals of the combination formed by the diode D in series with the coil B permits the said coil to be short-circuited before the interrogation proper is effected (closure of $I_2$ and putting into service of the measuring instrument). The time of application of voltage to the coil B is adjusted by the respective values of R and C to a value slightly less than the time which elapses between the closure of $I_1$ and the closure of $I_2$, the diode D serving to maintain a sufficiently high voltage at the terminals of T$h$.

It will be noted from the diagram shown in FIG 4 that:

The bridge only comprises one detector filament and one compensating filament;

The arms $R'_1$ and $R'_2$ which complete the bridge are fixed resistances;

The variable resistance $R_3$, connected in series with one of the fixed resistances $R'_2$ replaces the potentiometer P of FIG. 1.

This circuit arrangement has the same characteristic features as the previous circuit, except as regards the out-of-balance voltage which can be reduced without disadvantage in the case of measurement by means of a coding device.

A unit was tried out, comprising the support shown in FIGS. 3a, 3b and 3c, and the electrical arrangement following the diagram of FIG. 4.

A calibration carried out in a wind tunnel, taking as reference a mill-type anemometer, showed that the apparatus is very sensitive, its range of operation being comprised between 0 and 6 m./sec. with a fairly-high accuracy up to 2 m./sec.

Its behaviour was tested in a flow of air at a constant speed equal to 0.25 m./sec. and heavily laden with dust. The constant dust content, beginning at the end of one hour's operation, had the following characteristics: 38,100 particles per cu.cm., of which 91% were less than $5\mu$.

The duration of application of voltage to the bridge was 6.6 sec. per cycle of 5 minutes, the interrogation being effected at the fifth second.

Figure 6:
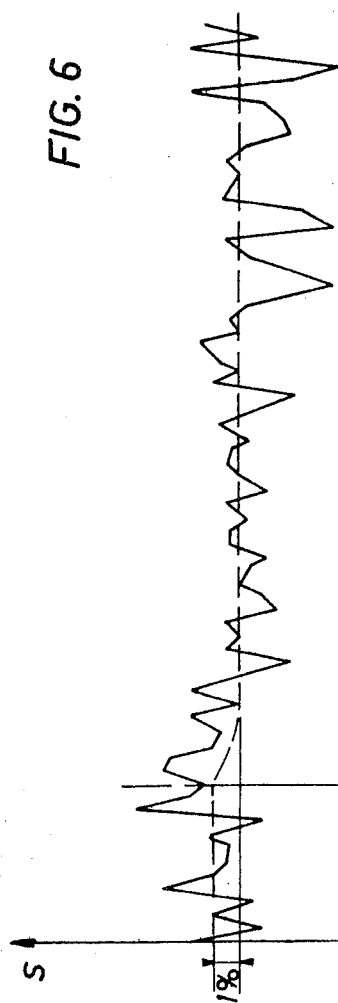

The electro-magnet being actuated at every application of voltage to the bridge, it is found (see FIG. 6) that the signal supplied by the bridge diminishes slightly during the first 40 minutes following the beginning of the loading with dust, and then becomes stabilized about a mean value. The reduction of the signal is very small and corresponds to a defect error of about 10% on the speed measured. This reduction of the signal is due to the deposit of dust which subsists close to the fixing points of the detector filaments.

The unit tested constitutes a good ventilation indicator, very sensitive at low speeds. Its use is indicated for measurments of speed in tunnels of fairly large size, such as mine levels, for example.

Figure 7:
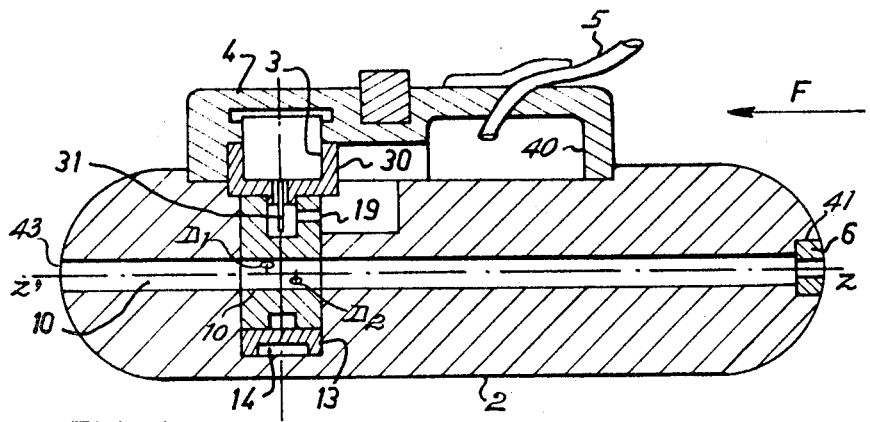
FIG. 7 is a diagrammatic section of an alternative form of construction.

The device shown diagrammatically in elevation-section in FIG. 7 can be employed for higher speeds of the gaseous flow.

Similar to the device shown in FIGS. 3a to 3c, the support is also provided with the filament carrier in accordance with FIGS. 2a, 2b and 2c, and comprises a body 2 of cylindrical form. In this case however, the support comprises, in the direction of flow F of the gaseous fluid, a hemispherical extremity 41 provided with a calibrated orifice 6 and is pierced with a cylindrical conduit 42 of constant diameter, greater than that of the callibrated orifice 6, and in which are arranged the detector filaments. The other extremity 43 of the support also terminates in a hemispherical portion 43.

It should be noted that, in this form of construction, it is desirable to place the detector filaments at a sufficient distance from the calibrated orifice 6 to reduce the effect of turbulence of the gaseous fllow at the outlet of the calibrated orifice.

Under these conditions, the signal supplied is stable, the zone of utilization of the apparatus being chosen by the use of calibrated orifices of different diameters. Thus, with a nozzle of 5 mm. in diameter, the zone of utilization extends from 0.25 m./sec. to 5 m./sec., while with a nozzle of 3 mm. in diameter, it extends from 0.60 m./sec. to 15 m./sec.

The behaviour of an apparatus of this kind, provided with an electrical system in accordance with the diagram of FIG. 1 was tested in a current of air of constant speed of 1.10 m./sec. charged with coal dust.

Figure 8:
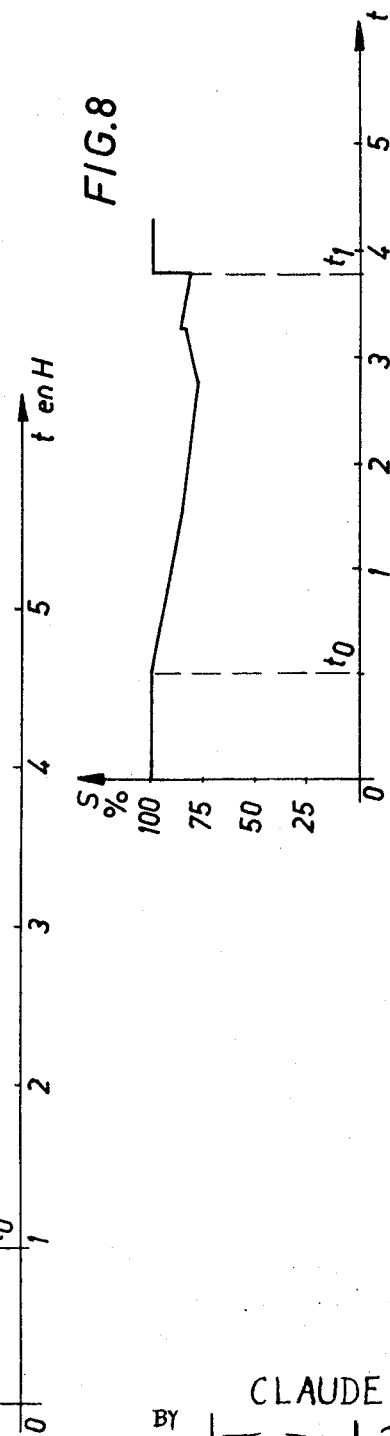
FIG. 8 is a curve showing the operation in the presence of a flow of gas of constant speed of the device according to the invention, as shown in FIG. 7.

The charging of the air flow with dust beginning at the instant $t_0$ (see FIG. 8), the electro-magnet being short-circuited, there is observed a slow diminution of the signal supplied by the bridge, reaching about 25% of the initial signal at the end of two and a half hours after the beginning of the dust phase. A shock applied at the instant $t_1$ by the electro-magnet brings the signal back to its initial level.

The apparatus shown in FIG. 7 can be employed as a ventilation indicator in the range of high speeds, such as for example in the measurement of speeds of gas-flow in conduits.

Figure 9:
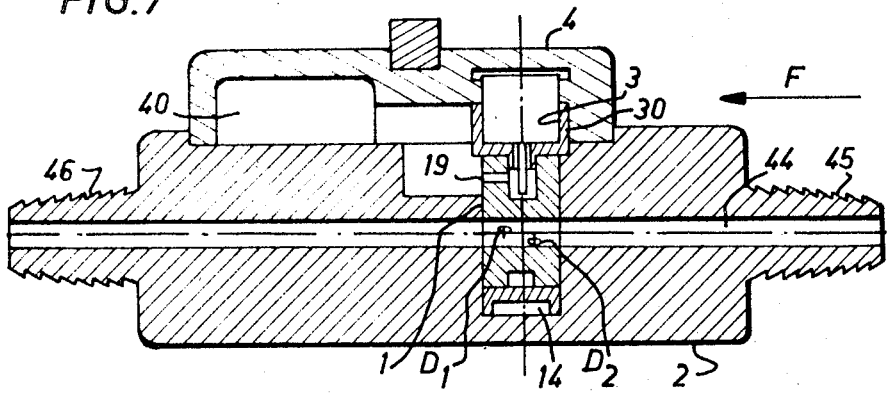
FIG. 9 is a diagrammatic section of a further form of construction.

Another alternative form of construction is shown in FIG. 9. In this figure, the device is again essentially constituted by the cylindrical support 2 pierced with a cylindrical conduit 44 of constant diameter, and in which are mounted the detector filaments $D_1$, $D_2$ supported by the filament carrier 1 of FIGS. 2a to 2c, associated with the support. In this case, the extremities 45, 46 of this latter have a conical shape and an appropriate relief permitting the coupling of the device to flexible piping systems.

Calibration as a flow-meter has shown that the signal supplied is very stable, the sensitivity is good and the response is instantaneous. The range of utilization of the apparatus is comprised between 10 and 250 litres/hr.

It is obvious that in this form of construction, the use of the electro-magnet reduces, in the same manner as previously, the effects of dust on the sensitivity, the stability and the accuracy or the apparatus.

It follows from the foregoing description that the use of an electro-magnet at every application of voltage to the Wheatstone bridge ensures effective removal of dust from the sensitive elements of the bridge and reduces to a very large extent the influence of the dust on the signal representing the speed of the flow of gas in which the apparatus according to the invention is immersed, the defect error on speed which subsists becoming acceptable.

Figure 11:
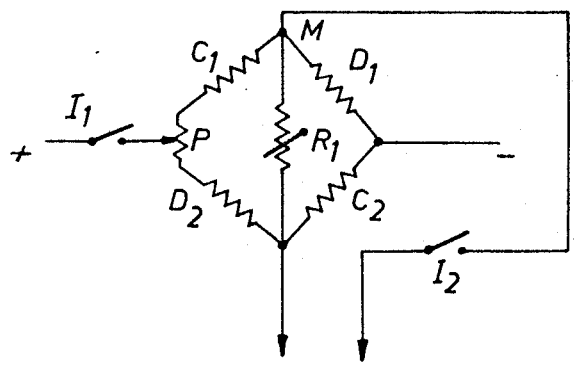
FIG. 11 is an electrical diagram corresponding to the anemometer according to the invention, in the case of its use in a flow of gas free from dust.
Figure 10:
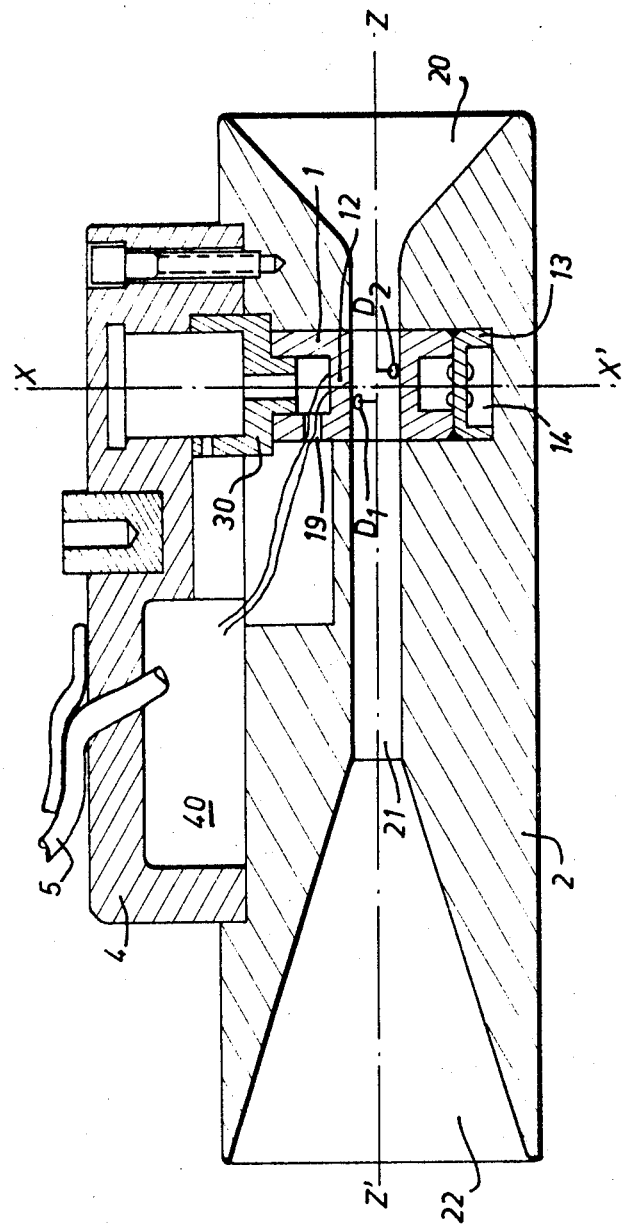
FIG. 10 shows the form of construction of FIG. 3a adapted to its use in a flow of gas free from dust.

Finally, all the alternative forms of the anemometer according to the invention can be employed easily and advantageously in the case of a flow of gas not charged with dust, such as that illustrated in FIGS. 10 and 11.

In fact, it is then only necessary to remove from the device the electro-magnet 3 fitted with its coil B, so as to obtain a device having the above characteristics and advantages.

It will of course be understood that it will fall within the scope of the invention to make modifications of detail to the device described, both mechanical and electrical, such as for example the addition of safety devices permitting the use of the apparatus in currents of explosive or inflammable gases, or again by utilizing a support different from those described above purely by way of explanation and not in any limitative sense.

What is claimed is:

1. A hot-wire anemometer connected to a source of electric current for measuring the speed of a flow of gas comprising
   a Wheatstone bridge having at least one arm constituted by a detector filament heated by the passage of the electric current therethrough supplying said bridge,
   said at least one detector filament being immersed in the flow of gas, the speed of which is to be measured,
   a filament carrier having a central channel for the passage of the gaseous flow in which said at least one filament is disposed transversely across said channel,
   said filament carrier being constituted by an elongated block, the main axis of which is perpendicular to the axis of said central channel for the passage of the gaseous flow, said block having a groove along the main axis of said block,
   a support having an elongated body,
   said support having a cavity therein for housing said filament carrier opening in a direction perpendicular to the axis of elongation of said body,
   and a conduit of the same diameter as said central channel of said filament carrier with said channel adjusted in said conduit.

2. A hot-wire anemometer connected to a source of electric current for measuring the speed of a flow of gas comprising
   a Wheatstone bridge having at least one arm constituted by a detector filament heated by the passage of the electric current therethrough supplying said bridge,
   said at least one detector filament being immersed in the flow of gas, the speed of which is to be measured;
   a filament carrier constituted by an elongated cylindrical block pierced with a central channel having its axis perpendicular to the main axis of said filament-carrier block and in the interior of which is disposed said at least one detector filament subjected to the passage of the gaseous flow, said block having a circular groove following the main axis of said block and delimiting a cylindrical ring surrounding said central channel of the filament carrier; a cylindrical cup of the same diameter and the same axis as said filament-carrier block to which it is rigidly fixed, said said cup forming a cavity filled with the same gaseous fluid of the gas flow in a stationary condition;
   a support constituted by an elongated cylindrical body having a cavity in said support in which is housed said filament carrier block; a cylindrical conduit of the same diameter as said channel of the filament-carrier block with said channel being adjusted in said conduit;
   said Wheatstone bridge having an arm opposite to said at least one arm constituted by a detector filament, constituted by a second detector filament and having the other two arms of said bridge being each constituted by a compensating filament of the same kind as said detector filaments and each disposed in said cavity of said cup fixed to said filament-carrier block.

3. A hot-wire anemometer as claimed in claim 2, in which said two detector filaments are disposed along two adjacent diameters at right angles of said central cylindrical channel in which they are mounted.

4. A hot-wire anemometer connected to a source of electric current for measuring the speed of a flow of gas comprising
   a Wheatstone bridge in which two opposite arms are each constituted by a detector filament, the other two arms of the bridge being each constituted by a compensating filament of the same kind as said detector filament,
   said detector filaments being immersed in the flow of gas which may convey dust and various particles and of which the speed is to be measured;
   a filament-carrier block constituted by an elongated cylindrical block pierced with a central channel having its axis perpendicular to the main axis of said filament-carrier block, and in the interior of which are disposed said detector filaments subjected to the passage of the gaseous flow; said block having a circular groove following the main axis of said block which de-limits a cylindrical ring surrounding said central channel of the filament-carrier; a cylindrical cup of the same diameter and the same axis as the filament-carrier block to which it is rigidly fixed, said cup de-limiting a cavity filled with the same gaseous fluid of the gas flow in a stationary condition; each of said filaments disposed in said cavity of said cup fixed to said filament-carrier block;
   a support constituted by an elongated cylindrical body having a cavity in said support in which is housed said filament-carrier block; a cylindrical conduit having the same diameter as said channel of the filament-carrier block and said channel being adjusted in said conduit;
   an electro-magnet housed in said circular groove of said filament-carrier block and having a coil and a plunger and having a blade adapted to strike against said cylindrical ring on said filament-carrier block through the intermediary of a rod to which it is fixed, whereby the influence on the measurement of the dust and particles which may be conveyed by the gaseous flow of which the speed is measured, is eliminated.

5. A hot-wire anemometer as claimed in claim 4, in which the coil of said electro-magnet is connected in series with the supply of electric current to the Wheatstone bridge.

6. A hot-wire anemometer as claimed in claim 4, in which the coil of said electro-magnet is supplied from a source of electric current separate from the supply source of electric current to said bridge.

7. A hot-wire anemometer as claimed in claim 4, in which the coil of said electric-magnet is shunted by the anode-cathode junction of a silicon controlled rectifier normally in the blocked condition, and the control electrode of which is controlled by a time-constant combination in such manner as to short-circuit said coil at an instant located between the instant of application of voltage to said bridge and the instant of interrogation proper.

8. A hot-wire anemometer as claimed in claim 4, in which said bridge is continually under tension and shocks from the striking of said blade against said cylindrical ring are applied before application of voltage to said bridge.

9. A hot-wire anemometer as claimed in claim 4, in which said bridge is put under tension at spaced-apart instants, shocks from the striking of said blade against said cylindrical ring being applied during the application of voltage to said bridge.

10. A hot-wire anemometer as claimed in claim 4, in which said support in which said filament-carrier block is housed comprises, in the direction of flow of the gaseous fluid, a convergent portion, a conduit of constant diameter inside which the detector filaments are mounted, and a divergent portion.

11. A hot-wire anemometer as claimed in claim 4, in which said support in which said filament-carrier block is housed comprises, in the direction of flow of the gaseous fluid, a hemispherical extremity provided with a calibrated orifice, a cylindrical conduit having a constant diameter greater than that of said calibrated orifice and in which are mounted the detector filaments, and a hemispherical extremity.

12. A hot-wire anemometer as claimed in claim 4, in which said support is composed of a cylindrical conduit of constant diameter in which the detector filaments are mounted, and the extremities of which permit coupling to flexible pipes.

References Cited

UNITED STATES PATENTS

| | | | |
|---|---|---|---|
| 2,777,535 | 1/1957 | Hull | 55—112 |
| 2,580,182 | 12/1951 | Morgan et al. | 73—204 X |
| 2,776,565 | 1/1957 | Hudson | 73—204 |
| 3,187,569 | 6/1965 | Los | 73—204 X |
| 3,217,543 | 11/1965 | Van Haagen | 73—359 X |

CHARLES A. RUEHL, Primary Examiner